United States Patent [19]
Ogoshi et al.

[11] Patent Number: 6,046,827
[45] Date of Patent: Apr. 4, 2000

[54] FILM IMAGE READING SYSTEM

[75] Inventors: Takeshi Ogoshi, Amagasaki; Yukari Maeda, Osaka, both of Japan

[73] Assignee: Minolta Co., Ltd., Osaka, Japan

[21] Appl. No.: 08/653,718

[22] Filed: May 23, 1996

[30] Foreign Application Priority Data

May 26, 1995 [JP] Japan .................................... 7-128683

[51] Int. Cl.[7] ................................................. H04M 1/40
[52] U.S. Cl. .......................... 358/487; 358/487; 358/500; 358/517; 358/518; 358/520; 358/261
[58] Field of Search ................................... 358/487, 518, 358/519, 506, 527, 293, 500, 517, 520, 261.1; 250/205

[56] References Cited

U.S. PATENT DOCUMENTS

| | | | |
|---|---|---|---|
| 4,825,065 | 4/1989 | Imai | 250/205 |
| 5,060,061 | 10/1991 | Shishido et al. | 358/506 |
| 5,132,788 | 7/1992 | Hirota . | |
| 5,138,443 | 8/1992 | Ikeda et al. | 358/453 |
| 5,181,105 | 1/1993 | Udagawa et al. | 358/261.1 |
| 5,181,127 | 1/1993 | Ogino et al. . | |
| 5,329,383 | 7/1994 | Collette | 358/500 |
| 5,387,929 | 2/1995 | Collier | 348/97 |

*Primary Examiner*—Edward L. Coles
*Assistant Examiner*—Twyler Lamb
*Attorney, Agent, or Firm*—Burns, Doane, Swecker & Mathis, LLP

[57] ABSTRACT

A film image reading system includes: a number of photoelectric conversion elements for converting a light image of a film image to an analog image signal indicative of a magnitude corresponding to a light amount; an exposure controller for controlling exposure time of the conversion elements; a converter for converting the analog image signal to a digital image signal; a signal correcting device for correcting the digital image signal to a proper output image signal in accordance with a reference relationship between digital image signal and output image signal, the reference relationship having a first range for variables of digital image signal and a second range for variables of output image signal; and a range changing device for changing the first range of the reference relationship in accordance with a controlled exposure time.

13 Claims, 10 Drawing Sheets

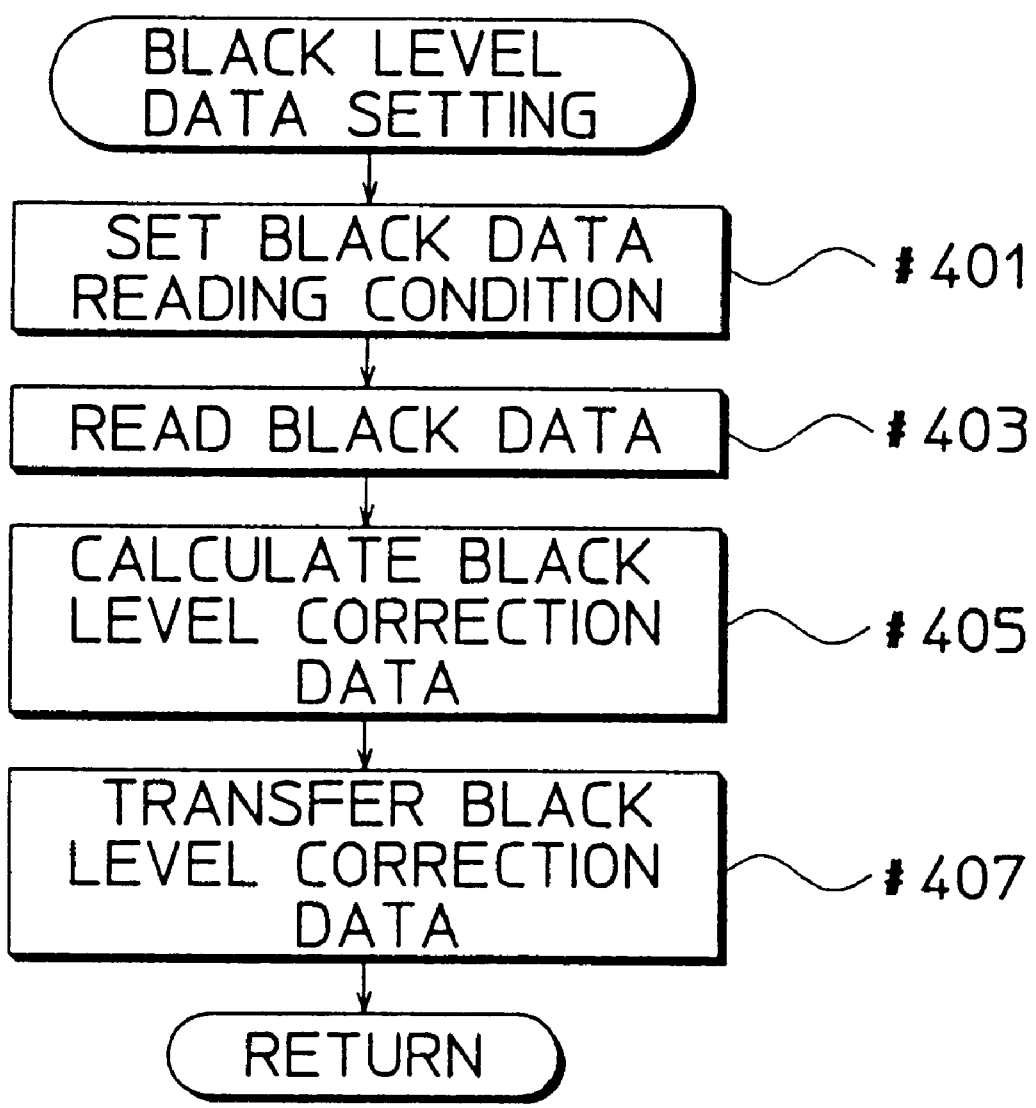

FILM IMAGE READING SYSTEM

BACKGROUND OF THE INVENTION

This invention relates to a film image reading system including a computer and a film image reader used as a peripheral device of the computer.

As a peripheral device of a computer, a film image reader is commercially available which picks up an image recorded in a frame of a 35-mm film, processes the picked up image signal into a digital data, and transfers the thus obtained digital data to the computer. Such a film image reader is provided with, as an image pickup device, a line sensor including, e.g., a CCD (Charge Coupled Device). The line sensor is slid or moved with respect to a strip of the film in a sub-scanning direction (longitudinal direction of the film) to pick up an image in each frame line by line. Then, image data reading conditions such as an exposure time are calculated based on the data obtained by pre-scanning, and the image is scanned based on the calculated conditions. During the image reading operation, the prior art film image reader controls the exposure time according to the image density of the film.

However, with the prior art film image reader, if the exposure time is too long, it takes time to output the read image from the film image reader to the computer, resulting in a reduced operability. This problem may be overcome by shortening the exposure time to a predetermined time and increasing the gain at an output or input side of the CCDs for the image in a latitude area not corresponding to the exposure time. However, in this case, the noises are amplified together with the amplitude of the CCD output. This results in a poor quality of the output image.

SUMMARY OF THE INVENTION

It is an object of the present invention to provide a film image reading system which has overcome the problems residing in the prior art.

It is another object of the present invention to provide a film image reading system which can obtain a high quality image within a shorter period of time.

The present invention is directed to a film image reading system comprising: an image pickup device which picks up a light image of an image recorded on a film to produce a raw image signal indicative of a magnitude corresponding to a light amount of the light image; a signal correcting device which corrects the raw image signal to a proper output image signal in accordance with a reference relationship between raw image signal and output image signal, the reference relationship having a first range for variables of raw image signal and a second range for variables of output image signal; and a range changing device which changes the first range of the reference relationship in accordance with a magnitude of the raw image signal.

The range changing device may shorten the first range of the reference relationship when the magnitude of the raw image signal is smaller than a predetermined value.

The image pickup device may be provided with a number of photoelectric conversion elements arranged in a predetermined form, the photoelectric conversion elements converting a light image to an analog image signal; and a converter for converting the analog image signal to a digital image signal indicative of a light magnitude level. The converter may be preferably provided with a shading correcting device.

Further, it may be appreciated to further provide the film image reading system with a reading condition controller for controlling a reading condition of the image pickup device. It may be preferable that the reading condition controller controls the image pickup device to perform a pre-scanning of the film before picking up a light image of an image recorded on the film and sets a reading condition of the image pickup device based on a result of the pre-scanning.

Further, the present invention is directed to a film image reading system comprising: an image pickup device including a number of photoelectric conversion elements arranged in a predetermined form, the image pickup device converting a light image of an image recorded on a film to an analog image signal indicative of a magnitude corresponding to a light amount of the light image; an exposure controller which controls exposure time of the image pickup device; a converter which converts the analog image signal to a digital image signal indicative of a light magnitude level; a signal correcting device which corrects the digital image signal to a proper output image signal in accordance with a reference relationship between digital image signal and output image signal, the reference relationship having a first range for variables of digital image signal and a second range for variables of output image signal; and a range changing device which changes the first range of the reference relationship in accordance with a controlled exposure time.

The exposure controller may preferably control the image pickup device to perform a pre-scanning of the film before picking up a light image of an image recorded on the film and sets an exposure time of the image pickup device based on a result of the pre-scanning.

The exposure controller may be provided with a calculator which calculates an exposure time corresponding to a result of the pre-scanning; a discriminator which discriminates whether a calculated exposure time is greater than a predetermined value; and a setter which is responsive to the discriminator and sets an exposure time of the image pickup device to the predetermined value when the calculated exposure time is discriminated to be greater than a predetermined value; and the range changing device is responsive to the discriminator and shortens the first range of the reference relationship when the calculated exposure time is discriminated to be greater than a predetermined value.

With the thus-constructed film image reading system, a raw image signal indicative of a magnitude corresponding to a light amount of the light image is corrected to a proper output image signal in accordance with a reference relationship between raw image signal and output image signal. The reference relationship has a first range for variables of raw image signal and a second range for variables of output image signal. The first range of the reference relationship is changed in accordance with a magnitude of the raw image signal. This will assure higher quality output image signals.

Also, a reading condition of the image pickup device is set based on a result of a pre-scanning of the film before picking up a light image of an image recorded on the film. This makes it possible to set an optimum reading condition corresponding to recorded conditions of images on a loaded film.

Further, the exposure time of the image pickup device is controllable. The exposure time is set based on a result of a pre-scanning. However, the exposure time is set to a predetermined value when a value obtained by calculation based on a result of a pre-scanning is greater than the predetermined value. Accordingly, the image pickup can be performed in a shorter time.

These and other objects, features and advantages of the present invention will become more apparent upon a reading of the following detailed description and accompanying drawings.

BRIEF DESCRIPTION OF THE DRAWINGS

FIG. 11 is a flowchart showing a subroutine "Black Level Correction Data Setting".

DETAILED DESCRIPTION OF THE PREFERRED

Embodiments of the Invention

Figure 1:
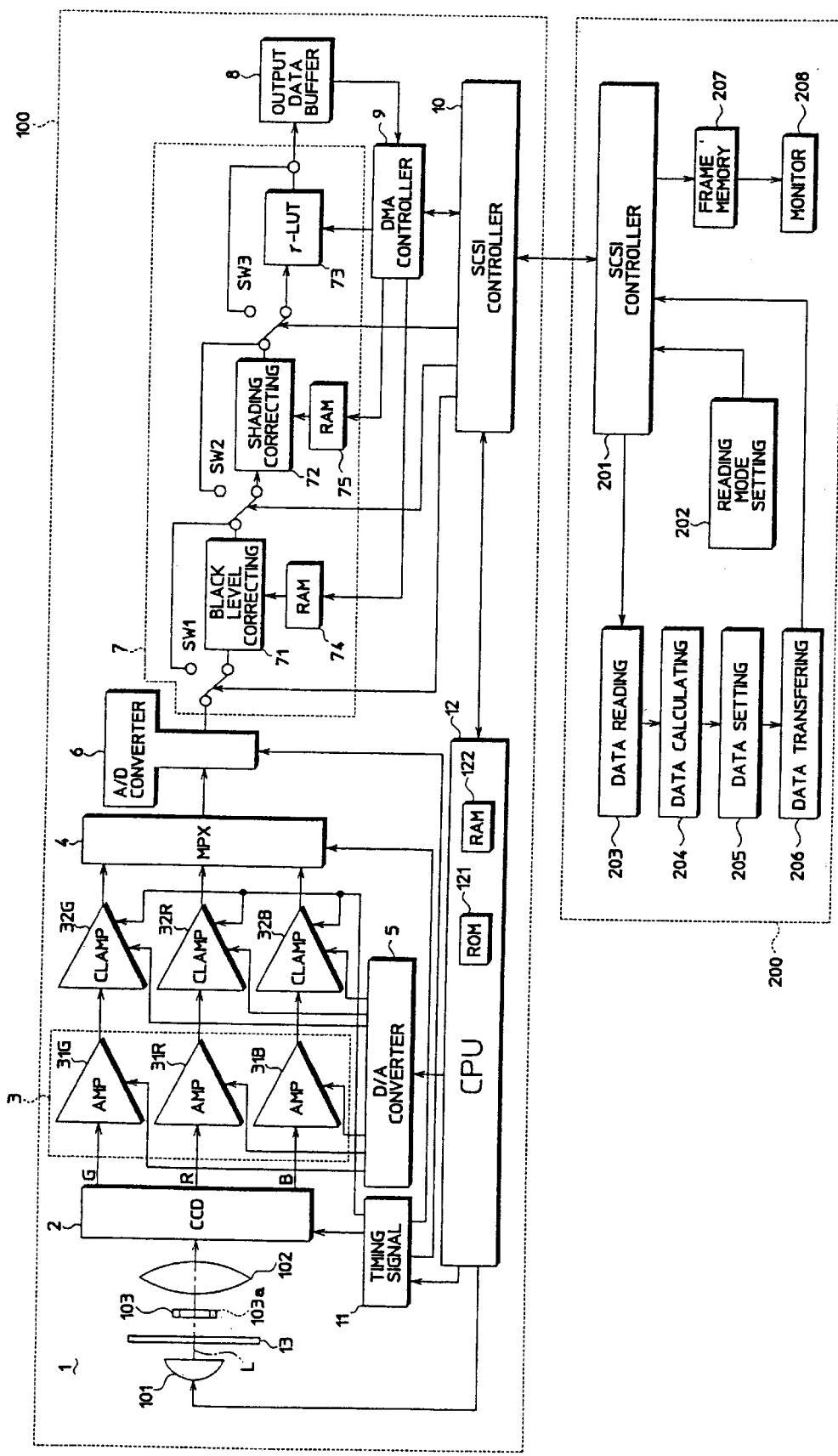
FIG. 1 is a block diagram of a film image reading system according to the invention.

A construction of a film image reading system according to the invention is described with reference to FIGS. 1 to 4.

The film image reading system is provided with a film image reader 100 and a host computer (hereinafter, "host PC") 200.

The film image reader 100 is connected with the host PC 200 in accordance with the SCSI standards, and functions as a peripheral device of the host PC 200 for supporting an image processing software which runs on the host PC 200.

Specifically, the film image reader 100 includes an optical system 1, an image pickup device (hereinafter, "CCD") 2, an amplifier unit 3, an analog multiplexer (hereinafter, "MPX") 4, a digital-to-analog (D/A) converter 5, an analog-to-digital (A/D) converter 6, a digital signal processor 7, an output data buffer 8, a DMA controller 9, an SCSI controller 10, a timing signal generator 11, and a CPU 12.

A power switch 152 and a focusing button 153 are provided at a bottom of the front surface of the film image reader 100. A film inlet 154 is formed above the button 153. The button 153 is operated to adjust the focal length of a lens system 102 (see FIG. 4) for forming a light image of a developed film 13 on a sensing surface of the CCD 2 including a CCD line sensor. The film inlet 154 is used to set the film 13 so as to read images recorded in respective frames of the film 13 (hereinafter, "film image"). The film inlet 154 is provided with a shutter 191 which is openable and closable so as to prevent entrance of dusts or the like into the film image reader through the inlet 154.

The film image reader 100 is capable of reading images recorded in a slide (mounted positive film) 131 or in a negative film 132 mounted on a special negative carrier. Both the slide 131 and the negative film 132 can be set through the film inlet 154.

The film image reader 100 functions as a peripheral device for supporting image processing in the host PC 200.

Figure 3:
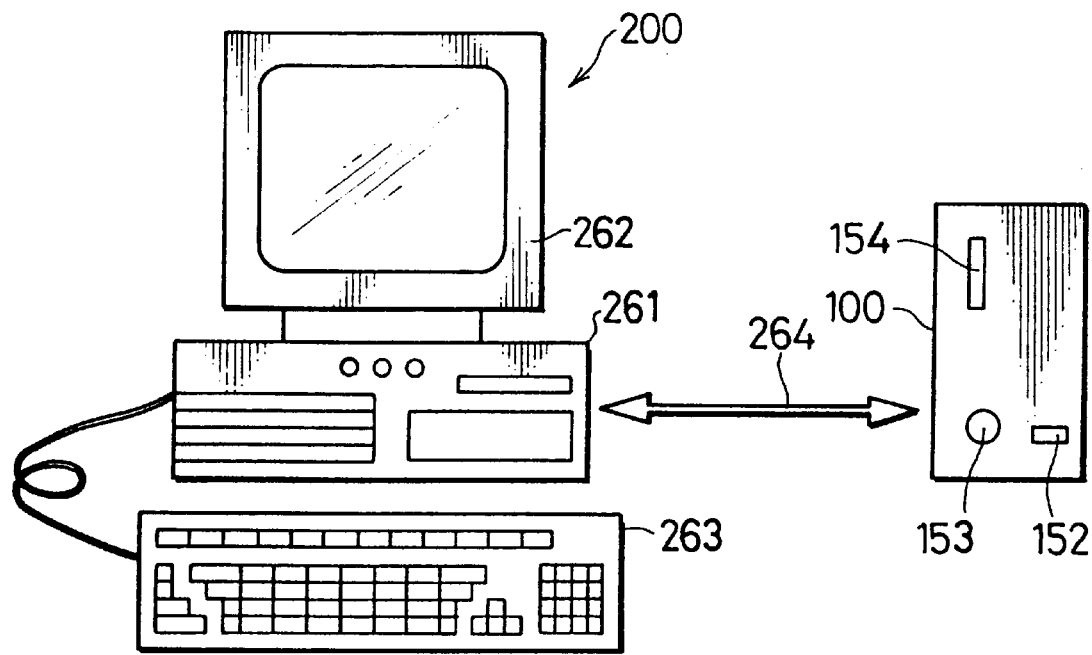
FIG. 3 is a diagram showing a combination of the film image reader and a host computer.
Figure 4:
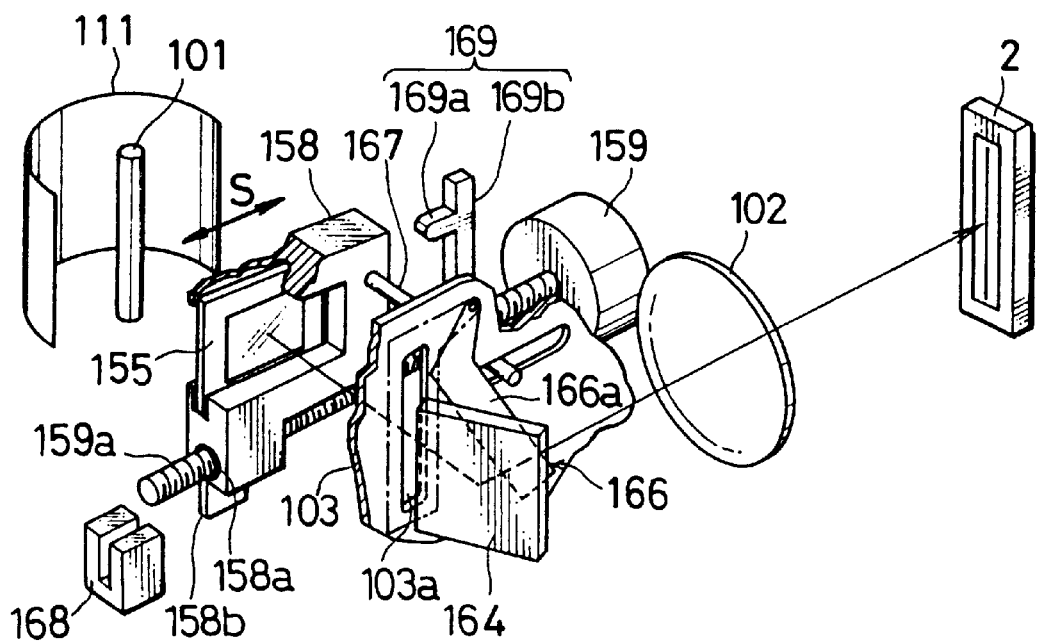
FIG. 4 is an exploded perspective view showing a construction of a main portion of the film image reader.

The host PC 200 includes a controller main body 261, a display 262 and a keyboard 263 as shown in FIG. 3. The film image reader 100 is connected with the controller main body 261 via an SCSI cable 264, and performs an image reading operation in accordance with a control command from the host PC 200.

Specifically, upon need of film images, the host PC 200 sends a specified command to the film image reader 100, causing it to read film images. The film image reader 100 implements initialization in accordance with the command sent from the host PC 200, reads data of film image (image data) by moving the CCD 2 with respect to the film images of the film 13, applies a specified image processing to the respective image data, and then transfers the processed image data to the host PC 200. This host PC 200 displays the received image data on the display 262 and stores them in an image memory provided in the controller main body 261.

The pickup operation of the film image and the transfer of the image data to the host PC 200 are repeated line by line. Upon completion of the transfer of the image data for all film images, the film image reader 100 finishes the film image reading operation. If the host PC 200 instructed the image reading operation in an auto-eject mode, the film image reader 100 ejects the film upon completion of the image reading operation.

In the film image reader 100, a film feeding system is provided in a position facing the film inlet 154. The film feeding system includes a carriage 158 for loading the film 13 inserted through the film inlet 154, and a pulse motor 159 for reciprocally moving the carriage 158 toward and away from the film inlet 154 (directions S in FIG. 4).

The carriage 158 includes, at its bottom, a nut portion 158a which is spirally fitted with a drive shaft 159a, a threaded bar, of the pulse motor 159. The drive shaft 159a extends in parallel with the directions S. By rotating the drive shaft (threaded bar) 159a, the nut portion 158a linearly moves along the drive shaft 159a, thereby reciprocally moving the carriage 158 along the directions S.

A light blocking plate 158b projects downward from the bottom face of the nut portion 158a. The plate 158b acts to block a light of a photoelectric switch 168 for detecting the carriage 158 in a home position. The photoelectric switch 168 has a U-shaped groove on which inner surface a light emitting element and a light receiving element are arranged to face each other, and is disposed in a suitable position below the leading end of the drive shaft 159a. When the carriage 158 moves to the home position, the light blocking plate 158b enters the U-shaped groove of the photoelectric switch 158b, thereby blocking the light emitted from the light emitting element. As a result, an arrival of the carriage 158 to the home position is detected.

On the other hand, in a specified position of the base end of the drive shaft 159a, there is provided an eject member 169 for moving the film 13 toward a loading inlet of the carriage 158 when the carriage 158 moves to an end position of its movable range. The eject member 169 includes a support 169b and a contact pin 169a projecting in a specified position of a side surface of the support 169b facing the carriage 158. The contact pin 169a is capable of being brought into contact only with the film 13 in the carriage 158.

While the carriage 158 is moving to the end position, the contact pin 169a of the eject member 169 comes into contact with the side face of the film 13 in the carriage 158 immediately before the carriage 158 reaches the end position, thereby restricting the movement of the film 13.

Accordingly, the film 13 moves toward the loading inlet with respect to the carriage 158, with the result that a film loading position in the carriage 8 is shifted and a part of the film 13 projects from the loading inlet. Thus, if the carriage 158 is moved to the home position in this state, a part of the film 13 projects from the film inlet 154 of the film image reader 100, allowing the withdrawal thereof.

In a specified position on the left side of the carriage 158 with respect to its moving direction (a direction in which the film 13 moves away from the film inlet 154), an illumination unit is provided which includes a lamp 101 such as a fluorescent lamp for illuminating the film 13 set in the carriage 158 and a semicylindrical reflecting plate 111 for reflecting the light from the lamp 101 toward the film 13. In a specified position on the right side of the carriage with respect to its moving direction, an image pickup system is provided which includes the CCD 2, the lens system 102 for focusing the light image of the film image on the CCD 2, and a mirror 164 for introducing the light image onto the CCD 2. Light to be incident upon the image pickup system is blocked by a light blocking plate 103 disposed between the film feeding system and the image pickup system.

The light blocking plate 103 is formed with a slit-like exposure window 103a in a position facing the lamp 101. The light image of the film 13 illuminated by the lamp 101 is introduced to the image pickup system while being divided into slit light images by the exposure window 103a.

In a specified position of the light blocking plate 103, an L-shaped shutter member 166 is provided which closes the exposure window 103a when the carriage 158 moves to the home position. The base end of the shutter member 166 is rotatably carried by the light blocking plate 103. A lever 167 for opening and closing the shutter member 166 according to the movement of the carriage 158 projects from the carriage 158.

While the carriage 158 moves toward the film inlet 154, the level 167 comes into contact with a light blocking portion 166a of the shutter member 166. As the carriage 158 further moves, the shutter member 166 is pressed toward the exposure window 103a by the lever 167. Upon arrival of the carriage 158 to the home position, the light blocking portion 166a of the shutter member 166 completely closes the exposure window 103a (a state indicated by phantom line in FIG. 4), thereby completely preventing the incident of the light on the image pickup system.

On the other hand, when the carriage 158 moves toward the pulse motor 159 from the home position, the lever 167 moves accordingly. As the lever 167 moves, the shutter member 166 rotates due to its weight in a direction reverse from the rotating direction when the exposure window 103a is closed. When the lever 167 is brought out of contact with the shutter member 166, the light blocking portion 166a of the shutter member 166 completely retracts from the exposure window 103a, thereby allowing the light image to be projected onto the image pickup system.

In this embodiment, the shutter member 166 is rotatable so as to rotate from the closing position where it closes the exposure window 103a to the retracted position due to its weight. However, the shutter member 166 may be movable in the sub-scanning direction and be biased toward the retracted position by a biasing member such as a spring. Such a shutter member returns from the closing position to the retracted position by the biasing force of the biasing member.

The CCD 2 is constructed by a color line sensor in which three line sensors each including a plurality of linearly arranged photoelectric conversion elements are arranged side by side. The respective line sensors are provided with color filters of red (R), green (G) and blue (B). The CCD 2 picks up the film image by separating it into the respective color components of R, G, B line by line.

Each line sensor includes a charge storing device for storing electric charges corresponding to an amount of incident light and a transfer device for reading the stored electric charges. At the base end of the charge storing device (at an end where the leading pixel is arranged when light reception signals (hereinafter, pixel signals) of the respective pixels are read), there is provided a black reference output portion for outputting a reference black level signal. In an intermediate portion of the charge storing device, there is provided a signal output portion for outputting the signal representative of the picked up film image. The pixels in the black reference output portion are masked, and the respective pixels in the signal output portion are provided with color filters.

The film image is read as follows. The carriage 158 in which the film 13 is set is fed to a specified image pickup position, the slit images of the film 13 divided by the exposure window 103a are projected onto the CCD 2. Electric charges are stored in the charge storing device of the CCD 2 during an exposure time set by the host PC 200, the stored charges are read to an external device via the transfer device. The charges stored in the respective pixels are read in a main scanning direction (a direction from the base end to the rear end of the line sensor, a direction from the lower end to the upper end of the CCD 2 in FIG. 4).

The amplifier unit 3 includes amplifiers 31G, 31R, 31B, and clamping circuits 32G, 32R, 32B arranged at upstream and downstream sides in correspondence with the respective channels of G, R, B. The amplifiers 31G, 31R, 31B applies gain adjustments to the image signals of the respective channels in accordance with analog gains input from the CPU 12 via the D/A converter 5. The analog gains are calculated in the host PC 200 in accordance with a procedure to be described later.

The clamping circuits 32G, 32R, 32B adjust black levels of the respective color image signals to clamp level output from the black reference output portion of the CCD 2 on the basis of a clamp level input from the CCD 2 via the D/A converter 5.

The MPX 4 selectively serially output the image signals of the respective channels. The A/D converter 6 converts the analog signal into a digital signal consisting of a multitude of bits. For example, the A/D converter 6 converts the analog color image signal into a digital signal of 10 bits.

The digital signal processor 7 includes a black level correcting device 71, a shading correcting device 72, a γ-LUT (look-up table) 73, RAMs 74, 75, switches SW1, SW2 and SW3. The processor 7 applies specified corrections such as black level correction, shading correction and γ-correction to the digitized image signals of the respective channels (hereinafter, "image data"), and outputs the thus obtained image data to the output data buffer 8. The γ-LUT 73 and the RAMs 74, 75 are constructed by SRAMs or the like, respectively, and the data for the corrections are stored in tables.

The black level correcting device 71 applies a black level correction using the table data stored in the RAM 74 in accordance with a procedure to be described later. This correction is made to cancel an offset of an input level to the A/D converter 6 when the shading correction is to be made or the film image or like data is to be read.

The shading correcting device 72 applies a shading correction using the table data stored in the RAM 75 in accordance with a procedure to be described later. The shading correction is made to cancel shading caused by the optical system 1 and the CCD 2.

The γ-LUT 73 is used for negative/positive inversion for inverting an image data of a negative image into an image data of a positive image and for the γ-correction for the G-, R- and B-signals.

The table data stored in the RAMs 74, 75 and the γ-LUT 73 are set by rewriting the memory contents by the host PC 200 via the DMA controller 9 and the SCSI controller 10.

The switches SW1, SW2 and SW3 are switched on and off to allow the image data to pass the black level correcting device 71, the shading correcting device 72 and/or the γ-LUT 73 while the image data is output from the A/D converter 6 to the output data buffer 8. The respective switches are on-off controlled by the host PC 200 via the SCSI controller 10. In FIG. 1, the switches SW1, SW2 and SW3 are on.

The output data buffer 8 is a memory for temporarily storing the respective color image data of G, R, B, which are output from the output data buffer 8 to the host PC 200 via the DMA controller 9 and the SCSI controller 10.

The DMA controller 9 controls the transfer of the table data and the image data between the SCSI controller 10 and the γ-LUT 73, the RAMs 74, 75, the output data buffer 8. The SCSI controller 10 functions as an interface in sending and receiving a variety of data including the image data between the film image reader 100 and the host PC 200.

The timing signal generator 11 outputs timing signals for controlling the driving timings of the respective elements in accordance with a control signal from the CPU 12. To the CCD 2 is input a timing signal for controlling a charge storing time (hereinafter, "exposure time") in the charge storing device, and the like. A timing signal used for the clamp level adjustment is input to the clamping circuits 32G, 32R, 32B. Further, clock signals for the synchronization are input to the MPX 4 and the A/D converter 6.

The CPU 12 includes a microcomputer provided internally with a ROM 121 for storing, e.g., control programs and a RAM 122 for temporarily storing the data, and controls the operation of the respective elements of the film image reader 100. Specifically, the CPU 12 controls the optical system 1 and a film carrier when the film 13 is scanned, the output of the timing signals from the timing signal generator 11 based on the exposure time data sent from the host PC 200 via the SCSI controller 10, and the gain adjustment in the amplifier unit 3 via the D/A converter 5 in accordance with the analog gains sent from the host PC 200 via the SCSI controller 10.

The CPU 12 also performs the following operations (1) to (3) in accordance with procedures to be described later. A variety of calculations are made by the host PC 200.

(a) Set-UP Operation

This operation is performed every time the film image reader 100 is powered in order to cancel a variation of a light amount and color balance caused by a change of the lens system 102, particularly the lamp 101 and the CCD 2 over time. The set-up operation includes a preset operation, the shading correction and the black level correction.

The preset operation is performed to calculate the exposure time of the CCD 2 and the analog gains which are necessary when the data for the shading correction are read, when the image data are read in the case of a positive film, and when the pre-scanned image data are read in the case of a negative film.

In the shading correction, the illumination light from the lamp 101 is directly projected onto the CCD 2, i.e., the CCD 2 is illuminated without the film 13. The image data is read and transferred to the host PC 200. A correction values calculated by the host PC 200 based on this image data are stored in the RAM 75.

Figure 5:
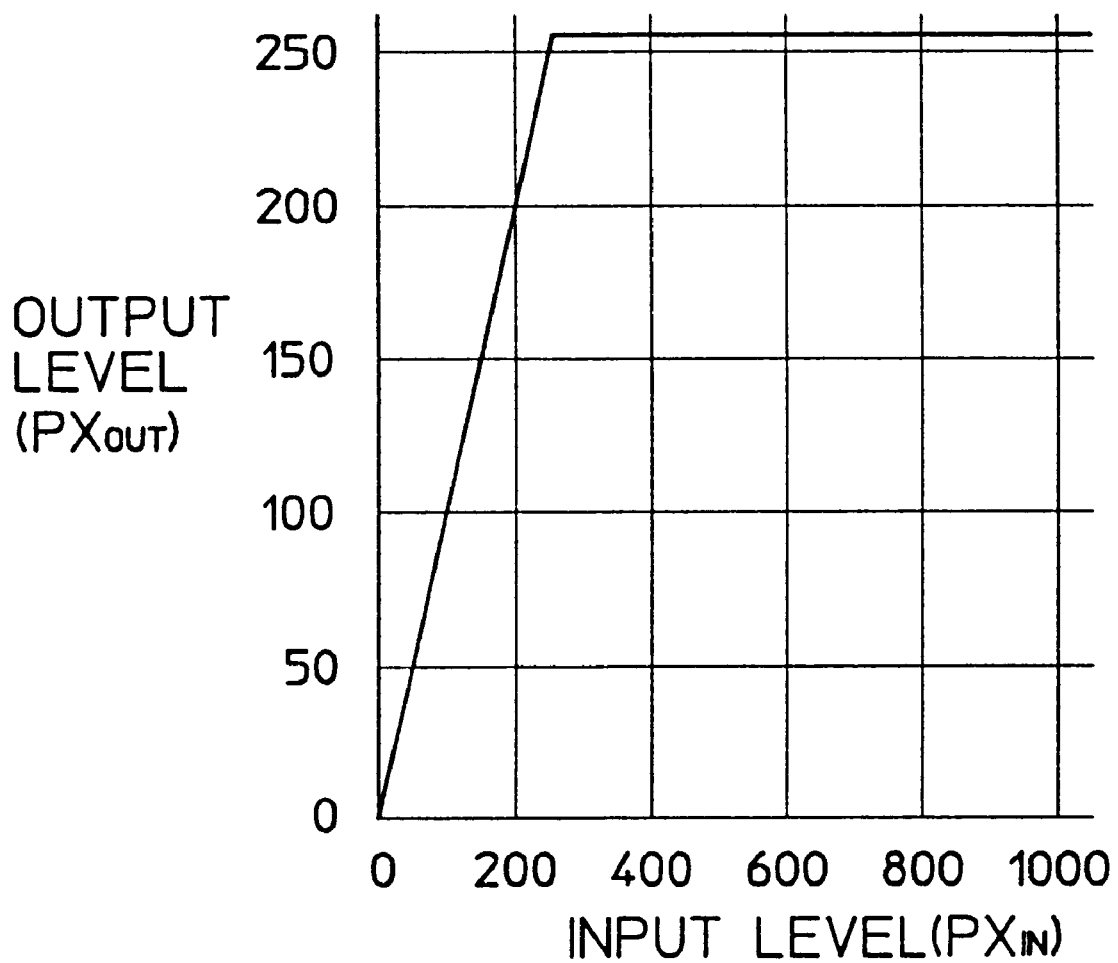
FIG. 5 is a graph showing an example of table data of black level correction values.

In the black level correction, the image data of one line of the CCD 2 is read in a non-signal state where the exposure window 103a is closed by the shutter member 166. At this time, in order to perform high speed data transfer and calculation, the switch SW3 is turned on and a table data of FIG. 5 is set in the γ-LUT 73. The obtained image data is transferred to the host PC 200. A correction values calculated by the host PC 200 based on the image data are stored in the RAM 74.

(2) Pre-Scanning

In the case that the film 13 is a negative film, pre-scanning is performed before main scanning in order to calculate the exposure time and the analog gains used when the image data is read by main scanning and to carry out an AE calculation such as a discrimination of the type of the image to be described later. During the pre-scanning, the exposure time and the analog gains calculated during the set-up operation are read. It should be appreciated that the image data may be read in a compressed manner.

(3) Main Scanning

The image is read under the reading conditions calculated during the pre-scanning in the case that the film 13 is a negative film, whereas it is read under the reading conditions obtained during the set-up operation in the case that the film 13 is a positive film. The read image data is transferred to the host PC 200 via the DMA controller 9 and the SCSI controller 10.

Next, the host PC 200 is described. The host PC 200 includes an SCSI controller 201, a reading mode setting device 202, a data reading device 203, a data calculating device 204, a data setting device 205, a data transferring device 206, a frame memory 207 and a monitor 208.

The SCSI controller 201 functions as an interface in sending and receiving the data between the film image reader 100 and the host PC 200. The reading mode setting device 202 is adapted to set the type of the film 13, i.e., a negative film or positive film, to be set in the film image reader 100. The data reading device 202 includes a RAM or like storage medium, reads and stores the image data out of the data sent from the film image reader 100.

The data calculating device 204 performs the following calculations and discriminations (1) to (5) in accordance with procedures to be described later, using the image data sent from the film image reader 100 or the like.

(1) Calculation of Initialization Values

Based on the image data of one line of the CCD 2 which was read when the film 13 is not set, there are calculated initialization values including the exposure time of the CCD 2 and the analog gains which are necessary during the shading correction, during the reading of the image data from the positive film, and during the reading of the AE data of the negative film.

(2) Calculation of a Shading Correction Value

A shading correction value is calculated based on the image data of one line of the CCD 2 which was read without the film 13 during the shading correction.

(3) Calculation of a Black Level Correction Value

A black level correction value is calculated based on the image data of one line of the CCD 2 which was read in the non-signal state where the exposure window 103a is closed by the shutter member 166.

(4) AE Calculation

In the case that the film 13 is a negative film, setting conditions during the main scanning are calculated based on the image data read during the pre-scanning. Specifically, the following processings are made.

(4-1) White Balance Failure Discrimination

The image data of the respective channels of G, R, B read during the pre-scanning are divided into specified blocks, and an average value is calculated for each block. Base balances of the R-, B-channels are calculated in accordance with procedures to be described later based on a maximum average value of the G-channel and average values of the blocks of the R-, B-channels corresponding to the block of the G-channel having the maximum average value. Unless the base balance of the channel lies within a specified range, the image data is discriminated to have a white balance failure (hereinafter, "WB failure"), and a WB flag thereof is set. In other words, WB flag(R)=1 or WB flag(B)=1.

(4-2) Color Failure Discrimination

An image reference value of each channel is calculated based on the block average value thereof in accordance with a procedure to be described later. Color balances of the R-, B-channels are calculated based on the image reference values and the base balances in accordance with a procedure to be described later. Unless the color balance lies within a specified range, the image of this channel is discriminated to have a color balance failure (hereinafter, "CF failure"), and the CF flag thereof is set. In other words, CF flag(R)=1 or CF flag(B)=1. The image having a color balance failure or color failure image has a partiality in color.

(4-3) Image Type Discrimination

The image type is discriminated based on a combination of the WB flags and CF flags of the R-, B-channels as shown in TABLE-1. TABLE-1 shows image types to be discriminated based on the combination of the WB flags and CF flags of the R-, B-channels.

TABLE 1

| FLAG COMB. | R-CHANNEL | | B-CHANNEL | | |
|---|---|---|---|---|---|
| | WB FLAG | CF FLAG | WB FLAG | CF FLAG | IMAGE TYPE |
| ① | 0 | 0 | 0 | 0 | STANDARD IMAGE |
| COMBs. OTHER THAN ① TO ⑨ | | | | | STANDARD IMAGE |
| ② | 0 | 1 | 0 | 0 | COLOR FAILURE IMAGE |
| ③ | 0 | 0 | 0 | 1 | |
| ④ | 0 | 1 | 0 | 1 | |
| ⑤ | 1 | 0 | 0 | 0 | BLACK-FREE IMAGE |
| ⑥ | 0 | 0 | 1 | 0 | |
| ⑦ | 1 | 0 | 1 | 0 | |
| ⑧ | 1 | 1 | 0 | 0 | BLACK-FREE AND COLOR FAILURE IMAGE |
| ⑨ | 0 | 0 | 1 | 1 | |

As shown in TABLE-1, if WB flag(R)=flag(B)=0, and CF or CF flag(R)=1flag (B)=1, i.e. in the case of combinations ②, ③, ④, the image is discriminated to be a color failure image.

If CF flag(R)=CF flag(B)=0, and WB flag(R)=1 or WB flag (B)=1 or WB flag(R)=WB flag (B)=1, i.e. in the case of combinations ⑤, ⑥, ⑦, the image is discriminated to be a black-free image.

Further, if WB flag(R)=CF flag(R)=1, and WB flag(B) =CF flag (B)=0, i.e. in the case of a combination ⑧ or if WB flag (R) =flag(R)=0, and WB flag(B)=CF flag(B)=1, i.e. in the case of a combination ⑨, the image is discriminated to a black-free and color failure image.

If WB flag(R)=CF flag(R)=WB flag(B)=CF flag(B)=0, in the case of a combination ①, the image is discriminated to be a standard image. When the combination is other than the combinations ① to ⑨, the image is also discriminated to be a normal image.

(4-4) Calculation of Exposure Time and Analog Gains

The exposure time and the analog gains are calculated based on the combination of the WB flags and CF flags of the R-, B-channels in accordance with a procedure to be described later.

(4-5) Calculation of Digital Gain

In the case that the calculated exposure time exceeds a predetermined time $T_0$, a ratio $T/T_0$ of the calculated exposure time T to the predetermined time $T_0$, i.e. a digital gain DTG ($=T/T_0$) is calculated.

(5) Calculation of γ-LUT Data

For the N/P inversion and γ-correction in the case of the negative film 13 and for the γ-correction in the case of the positive film 13, a table data to be set in the γ-LUT 73 is calculated in a procedure to be described later.

The data setting device 205 sets the respective data based on the values calculated by the data calculating device 204. The data transferring device 206 converts the respective set data into transfer data in form suitable to be transferred. The converted transfer data are transferred to the respective elements of the film image reader 100 via the SCSI controller 201.

The frame memory 207 is adapted to store one frame of image data obtained by the main scanning under the set reading conditions. The monitor 208 includes a CRT and displays the film image stored in the frame memory 207.

Next, the calculation of the LUT data to be set in the γy -LUT 73 for the N/P inversion and the γ-correction in the case of the negative film 13 is described.

The N/P inversion is carried out in accordance with Equations (1) to (3). $PX_{IN}$ and $PX_{OUT}$ denote an image data input to the γ-LUT 73 and an image data output therefrom, respectively.

When $0 < PX_{IN} <$ foot_point, $$PX_{OUT} = (A - 1023)/\text{foot\_point} \times 1023 \quad (1)$$

When foot_point $\leq PX_{IN} <$ knee_point, $$PX_{OUT} = 10^{(log_{10}(1023) - \gamma \times log_{10}(PX_{IN}) + ycn)} \quad (2)$$

When knee_point $< PX_{IN} < 1023$, $$PX_{OUT} = B/(1023 - \text{knee\_point}) \times (1023 - PX_{IN}) \quad (3)$$

A in Equation (1) denotes $PX_{OUT}$ when $PX_{IN}$=foot_point (see point F in FIG. 3), B in Equation (3) denotes $PX_{OUT}$ when $PX_{IN}$ =knee_point (see point K in FIG. 3), and ycn in Equation (2) denotes a $Px_{out}$ intercept when $\{\gamma \times log_{10} (PX_{IN}) + ycn\}$ passes table reference points (STx, STy). Further, foot_point=STx-50 and knee_point=512.

On the other hand, for the γ-correction, γ(R)=1.375, γ(G)=1.197 and γ(B)=1.197 are used for the respective colors.

Figure 6:
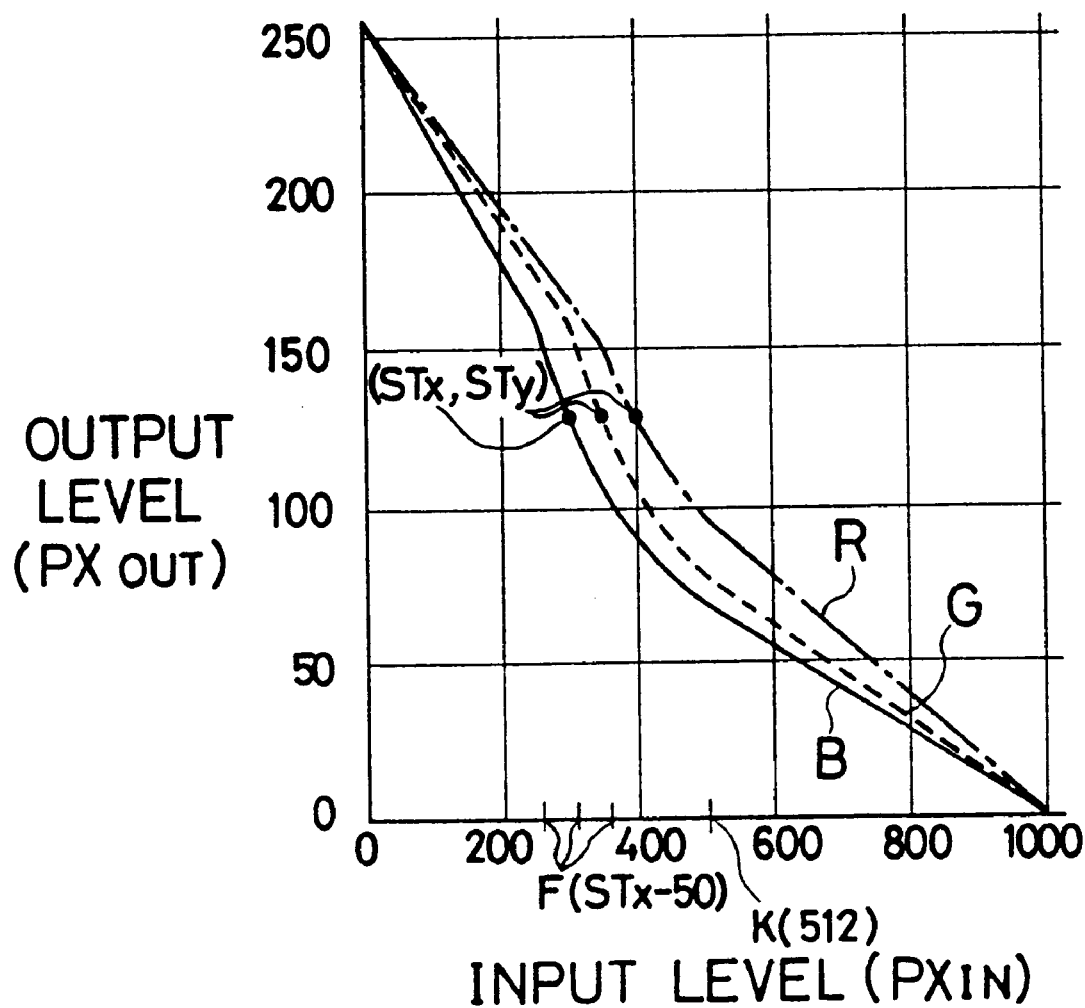
FIG. 6 is a graph showing an example of the black level correction value table data in the case of a negative film.

An example of thus obtained table data for the N/P inversion and the γ-correction is shown in FIG. 6.

In the case that the calculated exposure time T exceeds the predetermined time $T_0$, an input side of the γ-LUT data is compressed at the digital gain DTG, and the exposure time is set to the predetermined time $T_0$. For example, if the table data is as shown in FIG. 6, the table data is changed to the one shown in FIG. 7 if the digital gain DTG=1.5.

Figure 7:
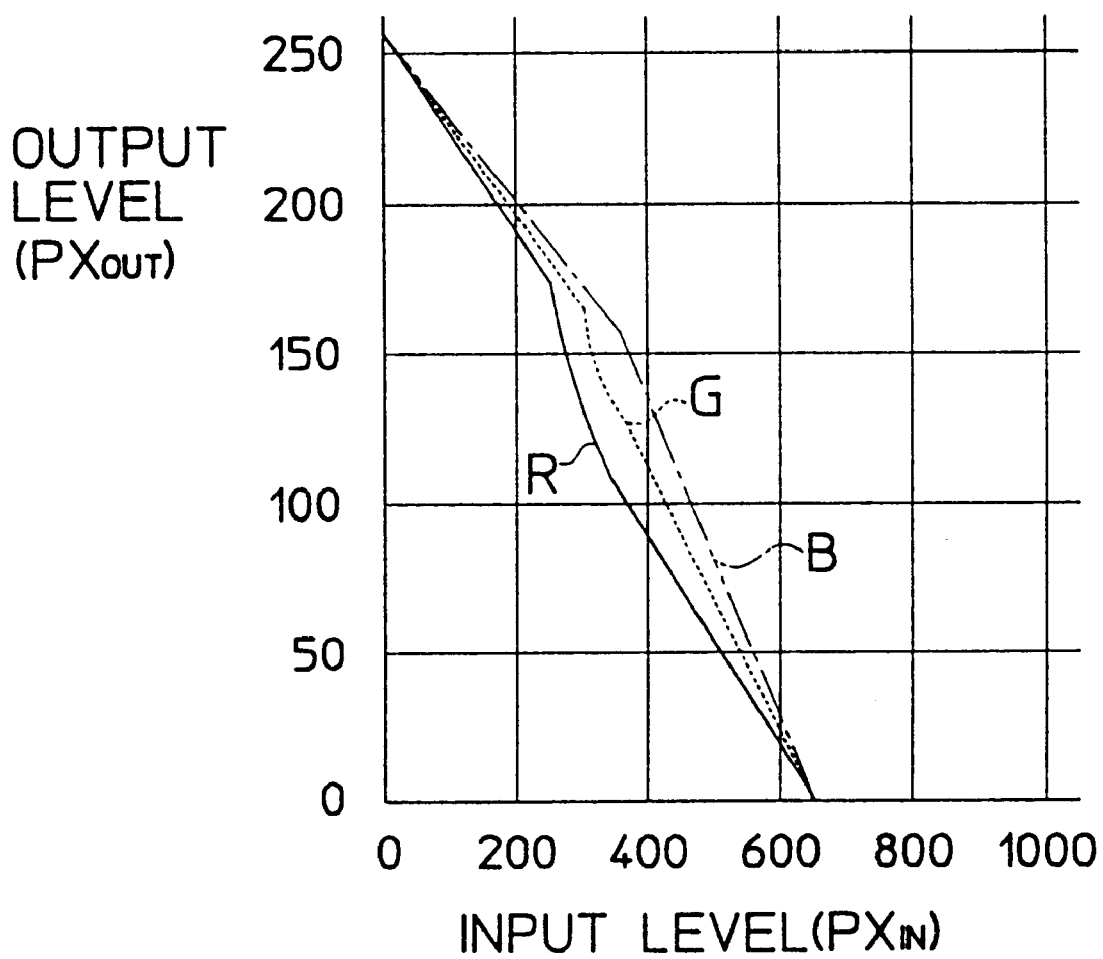
FIG. 7 is a graph showing black level correction value table data when a digital gain is 1.5 in FIG. 6.

FIG. 7 is obtained by changing the table data of FIG. 6 such that an input level is compressed to ⅔ in relation to an output level. More specifically, in FIG. 6, for the input level variable from 0 to 1023, the output level varies from 255 to 0. In FIG. 7, for the input level variable from 0 to 682, the output level varies from 255 to 0, and the output level is 0 for the input level of 683 to 1023. Accordingly, the curves are more steeply sloped in FIG. 7 than in FIG. 6.

Similarly, if the digital gain DTG=2.0 in the case of FIG. 3, for the input level variable from 0 to 512, the output level varies from 255 to 0, and the output level is 0 for the input level of 513 to 1023. Thus, the curve is more steeply sloped than the one in FIG. 7.

The compression of the input level by the digital gain may be carried out only when a preview image, i.e., an image data used to confirm the brightness and colors of the image prior to the main scanning is read.

Next, the calculation of the LUT data to be set in the γ-LUT 73 for the γ-correction in the case of the positive film 13 is described.

The γ-correction is performed in accordance with Equations (4) and (5). $PX_{IN}$ and $PX_{OUT}$ denote an image data input to the γ-LUT 73 and an image data output therefrom, respectively.

When $0 < PX_{IN} < \text{foot\_point}$, $$PX_{OUT} = 4 \times PX_{IN} \qquad (4)$$

When $\text{foot\_point} < PX_{IN} < 1024$, $$PX_{OUT} = 1023 \times \{PX_{IN}/1023\}^{0.45} \qquad (5)$$

where foot_point=82.

Figure 8:
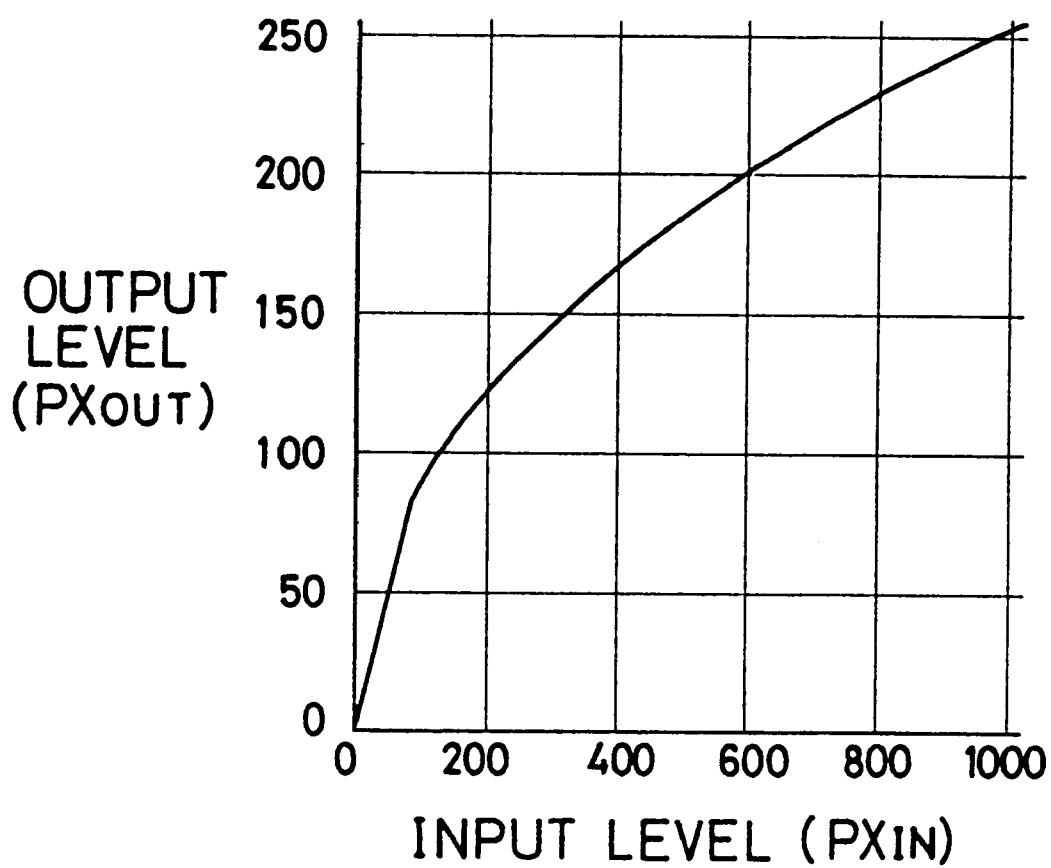
FIG. 8 is a graph showing an example of the black level correction table data in the case of a positive film.

An example of thus obtained table data for the γ-correction of the positive film is shown in FIG. 8.

As shown in Equations (4) and (5), the same equation is used for the respective colors of G, R, B in the case of the positive film, and the values are fixed. Accordingly, the table data may be calculated in advance and stored in the ROM 121, and may be set in the γ-LUT 73 from the ROM 121 when the image data is read.

As described above, in the case of the negative film 13, an image output speed at which the entire frame of image is output is slow if the exposure time T exceeds the predetermined time $T_0$. However, since the exposure time is set to $T_0$ if the calculated exposure time T exceeds the predetermined time $T_0$, the image can be output to the output data buffer 8 within a shorter period of time.

Further, the ratio of the calculated exposure time T to the predetermined time $T_0$, i.e., the digital gain is calculated and the input level is compressed at the digital gain when the γ-LUT data to be set in the γ-LUT 73 is calculated. Accordingly, an output of an image in the latitude area not corresponding to the exposure time is allowed to have a high quality.

Figure 9:
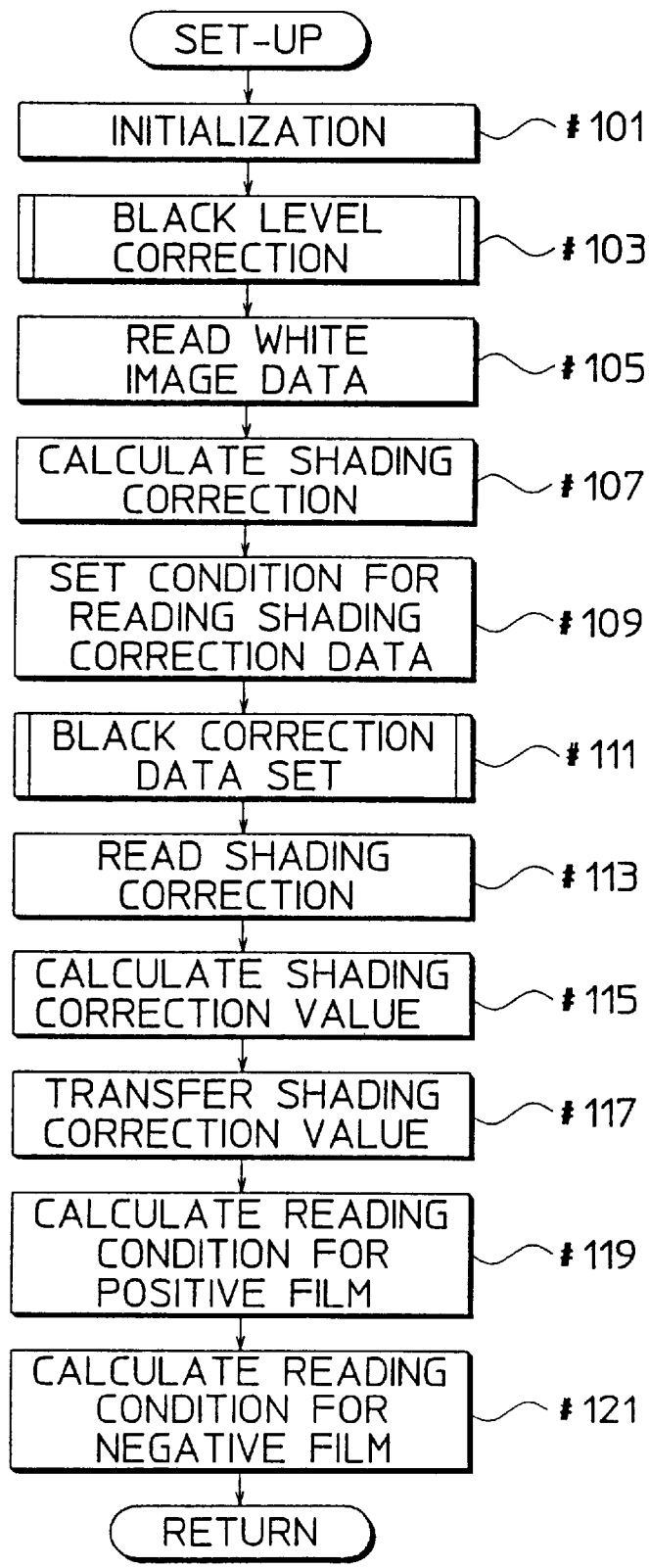
FIG. 9 is a flowchart showing a procedure of a "SET-UP" routine.

FIG. 9 is a flowchart showing a procedure of the set-up operation which is carried out every time the film image reader 100 is powered.

First, the initialization for the black level correction and the shading correction is carried out (Step #101).

More specifically, the exposure time SET_T and the analog gains GGAIN, RGAIN, BGAIN of the respective channels are set, e.g., SET_T=0.46 msec, GGAIN= RGAIN=BGAIN=6 dB so that the level of the signal input to the A/D converter 6 does not overflow even in the case that the variation of the devices such as the lamp 101 and the lens system 102 are at maximum. At this stage, the switches SW1, SW2, SW3 are on, off, on, respectively, and the shading correction and the γ-correction are not performed.

Subsequently, a black level correction data is set in accordance with a procedure to be described later (Step #103), and then a white image data is read (Step #105).

The white image data refers to an image data picked up when the film 13 is not set between the lamp 101 and the CCD 2. Specifically, the image data is read 16 times by one line of the CCD 2, i.e., 2688 pixels×3 channels.

Subsequently, data reading conditions for the shading correction are calculated (Step #107).

First, a sum or an average value of the 16 data read in Step #105 is calculated for each channel and each pixel. Further, in order to avoid an influence of noises, the input data is divided into 32 blocks, and a sum or an average value of the image data obtained by 84 pixels is calculated for each block. A maximum value within the block of the G-channel is set to Gmax, and the R-channel and B-channel of the same block are set to Rmax, Bmax.

An exposure time SHD_T used for the shading correction is calculated in accordance with Equation (6) which restricts an input range to 90% so that the level of the signal input to the A/D converter 6 does not overflow.

$$SHD\_T = 0.9 \times SET\_T \times 255/G\text{max} \qquad (6)$$

Further, the analog gains of the respective channels are calculated based on Gmax, Rmax, Bmax as seen in Equation (7):

$$GGAIN = 6 \text{ dB}$$

$$RGAIN = G\text{max}/R\text{max} + 6 \text{ dB}$$

$$BGAIN = G\text{max}/B\text{max} + 6 \text{ dB} \qquad (7)$$

Subsequently, the respective conditions for reading the shading correction data are set (Step #109).

The exposure time and the analog gains of the respective channels are set to the values calculated in Step #107. Further, the switches SW1, SW2 and SW3 are held on, off, off, respectively.

Subsequently, the black correction data are set in a procedure to be described below (Step #111). Then, the image used for the shading correction is read (Step #113).

The image data is read 64 times by one line of the CCD 2, i.e., 2688 pixels×3 channels when the film 13 is not set between the lamp 101 and the CCD 2.

Subsequently, the shading correction values are calculated (Step #115). First, a sum or average value of the 64 image data is calculated for each channel and pixel. If Gmax_s, Rmax_s, Bmax_s denote maximum values of the calculated values of the respective channels, shading correction values GSHDDATA(pix), RSHDDATA(pix), BSHDDATA(pix) of the respective pixels are calculated as ratios of the maximum values Gmax_s, Rmax_s, Bmax_s of the respective channels to values G(pix), R(pix), B(pix) of the pixels as seen in Equation (8):

$$GSHDDATA(\text{pix}) = G\text{max}\_s/G(\text{pix})$$

$$RSHDDATA(\text{pix}) = R\text{max}\_s/R(\text{pix})$$

$$BSHDDATA(\text{pix}) = B\text{max}\_s/B(\text{pix}) \qquad (8)$$

Then, the calculated shading correction values are transferred (Step #117). The calculated values are converted into transfer data which are transferred line by line in the order of G, R, B via the SCSI controller 201 and stored in the RAM 202 of the CPU 12 via the SCSI controller 10.

Subsequently, reading conditions in the case of the positive film are calculated (Step #119). The exposure time and the analog gains used for reading the image data when a positive film is set in the film image reader 100 as the film 13 are set to fixed values regardless of the film.

An exposure time POS_T is calculated in accordance with Equation (9) so that a maximum transmittance of a standard positive film is 100% of the input range of the A/D converter 6:

$$POS\_T = SET\_T \times 255 \times (Gmax \times 0.8) \qquad (9).$$

Further, the analog gains are so calculated so that the white balance suits when the film 13 is not set and are, in this embodiment, calculated in accordance with Equation (7) similar to the shading correction data reading conditions.

Subsequently, reading conditions in the case of the negative film are calculated (Step #121). First, when a negative film is set in the film image reader 100 as the film 13, initial values used to perform pre-scanning for the AE calculation are calculated.

An exposure time AE_T is calculated based on SET_T and Rmax in accordance with Equation (10) lest the light transmitted through a base area of a standard negative film should exceed the input level of the CCD and saturate:

$$AE\_T = 1.4 \times SET\_T \times 255/(Rmax \times 0.6) \qquad (10).$$

The analog gains GGAIN, RGAIN, BGAIN of the respective channels are calculated in accordance with Equation (11) so as to cancel the color of the base area of the standard negative film:

$$GGAIN = 6 \text{ dB}$$

$$RGAIN = Gmax/(Rmax \times 2.5) + 6 \text{ dB}$$

$$BGAIN = Gmax/(Bmax \times 0.7) + 6 \text{ dB} \qquad (11).$$

The color of the base area of the standard negative film is expressed as R:G:B=2.5:1:0.7.

Subsequently, a shading offset value SDOF used to calculate the exposure time for reading the image data obtained from the negative film is calculated as follows. One line of data of the G-channel obtained in Step #113 is divided into 32 blocks, and a sum or an average value of the data corresponding to 84 pixels is calculated for each block. The value SDOF is calculated in the form of a ratio of the value of each block to the maximum value Gmax thereof.

Figure 10:
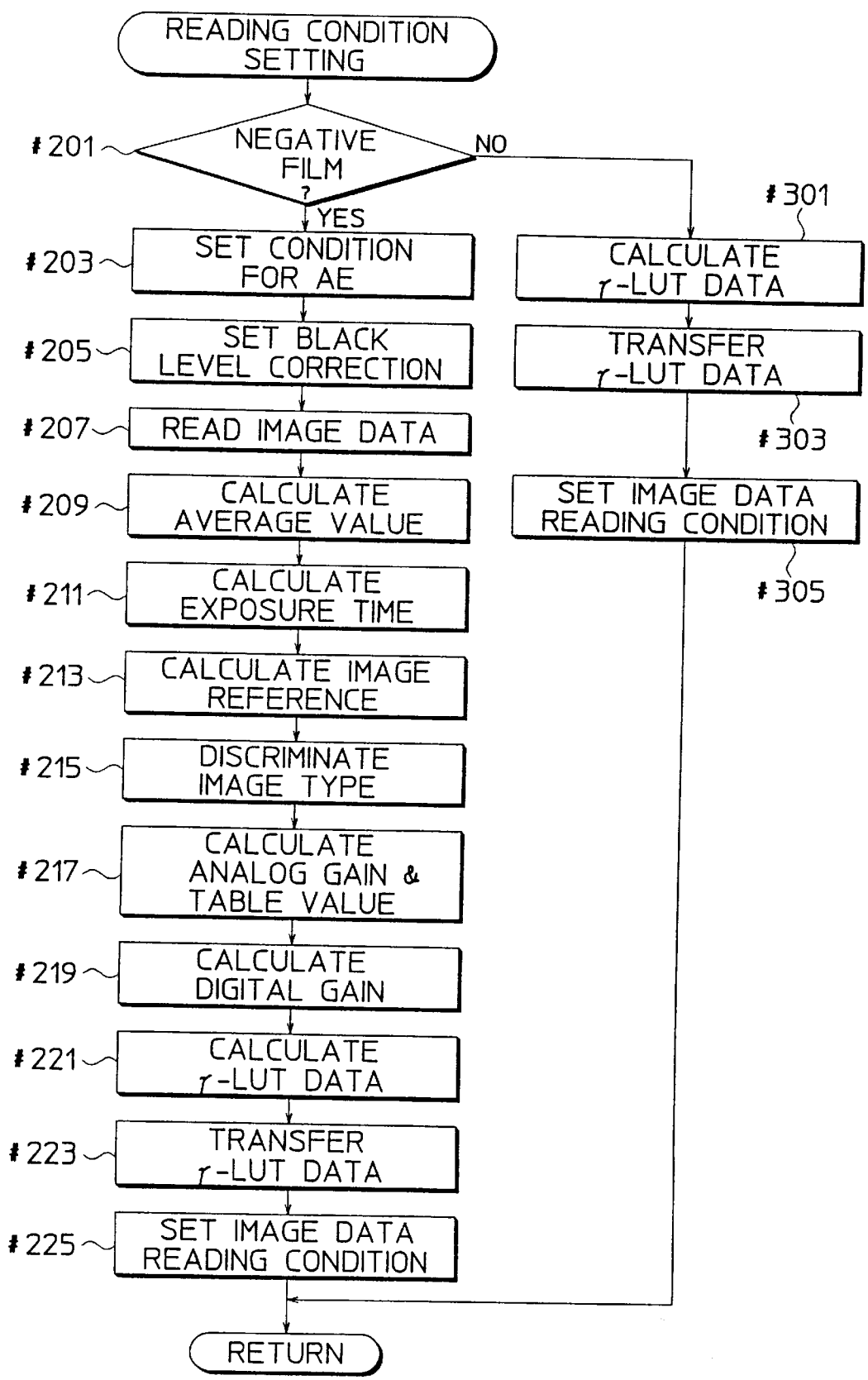
FIG. 10 is a flowchart showing a procedure of setting image data reading conditions.

FIG. 10 is a flowchart showing a procedure of setting image data reading conditions.

First, it is discriminated whether the mode set in the reading mode setting device is a negative film mode or positive film mode (Step #201). If the positive film mode is set (NO in Step #201), Step #301 follows.

On the other hand, if the negative film mode is set (YES in Step #201), the conditions for reading the image data during the pre-scanning for the AE calculation are set (Step #203). At this stage, the exposure time and the analog gains of the respective channels are set to the values calculated in Step #121. The switches SW1, SW2 and SW3 are set on, on, off, respectively, and the black level correction and the shading correction are carried out.

Subsequently, the black level correction data are set in accordance with a procedure to be described below (Step #205). The image data in the entire recording area of the film 13 is read under the reading conditions set in Step #203, e.g., at a compression ratio of 1/12 lines. The obtained image data is transferred to the host PC 200 (Step #207).

The image data is compressed to perform the processing faster. The reduction in the image quality caused by the image compression does not matter because the pre-scanning is made only for the AE calculation. If the compression ratio is set to 1/12, only one line of image is picked up out of 12 lines of image. The AE data can be calculated with a small amount of image data.

The calculations are performed in the data calculating device 204 of the host PC 200 (Steps #209 to #225). First, in order to avoid an influence of noises or the like, the input image data is divided into 42×32 blocks for each channel, and an average value of each block is calculated. Further, an average value of the black level correction data for each pixel is calculated and set to KAVE (Step #209).

Subsequently, an exposure time NEG_T is calculated (Step #211). First, maximum values MXG, MXR, MXB of the respective channels are obtained out of the average values of the respective blocks calculated in Step #209, and are converted into output levels CCDG, CCDR, CCDB of the CCD 2 in accordance with Equation (12):

$$CCDG = MXG$$

$$CCDR = MXR \times 2.5$$

$$CCDB = MXB \times 0.7 \qquad (12).$$

The exposure time NEG_T is calculated in accordance with Equation (13) so that these values are read as a maximum level of a 10 bit range in the γ-LUT 73 after being corrected in the black level correcting device 71 and the shading correcting device 72:

$$NEG\_T = AE\_T \times (1023 - KAVE) \times SDOF/CCDMAX \ldots (13)$$

where CCDMAX refers to a maximum value among CCDG, CCDR, CCDB.

Next, image reference values AVG, AVR, AVB are calculated (Step #213). The image reference values AVG, AVR, AVB are average values of the image obtained in an area of 1 to 50% of the range defined by the minimum and maximum average values of the respective blocks. By averaging the image data of 1 to 50%, a human skin level having a reflection coefficient of 20% can be calculated based on a standard film characteristic in an image having a standard luminance distribution without being subject to a very dark area and a bright area. In this embodiment, the input image data consists of 10 bits, the average value is calculated in an area of $2^4 (1.6\%)$ to $2^9 (50\%)$.

Subsequently, the type of the image is discriminated (Step #215). The average values of the respective channels in the block where the average value of the G-channel is at maximum out of the average values of the respective blocks calculated in Step #209 are set to base data BASEG, BASER, BASEB. Based on these base data, base balances BBR, BBB of the R-, B-channels are calculated in accordance with Equation (14):

$$BBR = BASEG/BASER$$

$$BBB = BASEG/BASEB \qquad (14)$$

In the case that the calculated base balance BBR is as defined in Equation (15), the image is discriminated to have a WB failure since there is a deviation in the black balance of the R-channel, channel, and the WB flag(R) is set to 1:

$$BBR < 0.5 \text{ or } BBR > 2 \qquad (15).$$

Further, in the case the calculated base balance BBB is as defined in Equation (16), the image is discriminated to have a WB failure since there is a deviation in the black balance of the B-channel, and the WB flag(B) is set to 1:

$$BBB < 0.5 \text{ or } BBB > 2 \qquad (16)$$

Further, color balances CFR, CFB of the R-, B-channels are calculated based on the image reference values AVG, AVR, AVB calculated in Step #213 in accordance with Equation (17):

$$CFR=(BBR \times AV)/AVG$$

$$CFB=(BBB \times AVB)AVG \qquad (17)$$

In the case that the calculated color balance CFR is as defined in Equation (18), the image is discriminated to have a color failure since there is a deviation in the color balance of the R-channel, and the CF flag(R) is set to 1:

$$CFR<0.8 \text{ or } CFR>2 \qquad (18)$$

Further, in the case that the calculated color balance CFB is as defined in Equation (19), the image is discriminated to have a color failure since there is a deviation in the color balance of the B-channel, and the CF flag(B) is set to 1:

$$CFB<0.5 \text{ or } CFB>1.2 \qquad (19)$$

Based on the combination of the WB flags and the CF flags, the obtained film image is discriminated to be such a type as shown in TABLE-1.

Next, the analog gains and the table reference values are calculated (Step #217). Based on the combination of the WB flags and the CF flags, the analog gains used to read the image are and the table reference values GMMAVE(G), GMMAVE(R), GMMAVE(B) which serve as bases for calculating the γ-LUT data are calculated for the respective channels as shown in TABLE-2 and TABLE-3 to be described below.

Subsequently, the digital gain is calculated (Step #219). In the case that the exposure time NEG_T calculated in Step #211 exceeds a predetermined time, e.g., 7 msec., a ratio of the calculated exposure time NEG_T to 7 msec., i.e., the digital gain DTG is calculated:

$$DTG=NEG\_T/7.0 \qquad (20).$$

In this case, when the table data of the γ-LUT 73 is calculated, its input level is compressed at the digital gain DTG, and the exposure time for reading the image is set to the predetermined time, i.e., 7 msec.

Next, the γ-LUT data to be set in γ-LUT 73 are calculated for the respective channels in accordance with Equations (1) to (3) (Step #221). For example, if STx=GMMAVE (G) in the G-channel, the reference point (STx, STy) of the γ-LUT data obtained in accordance with Equations (1) to (3) is a point where the table reference value GMMAVE(G) obtained in Step #217 is 50% of the output, i.e. a point where STy=128 in FIG. 6.

Subsequently, the γ-LUT data are transferred (Step #223). The calculated γ-LUT data are converted into transfer data, which are transferred to the film image reader 100 for each channel via the SCSI controller 201 and stored in the γ-LUT 73 via the SCSI controller 10 and the DMA controller 9.

Subsequently, the image data reading conditions are set (Step #225). The exposure time calculated in Step #211 and the analog gains calculated in Step #217 are set, and the switches SW1, SW2 and SW3 are all set on so as to perform the black level correction, the shading correction and the γ-correction.

On the other hand, if the positive film mode is discriminated to be set in Step #201, the γ-LUT data to be set in γ-LUT 73 are calculated in accordance with Equations (4) and (5) (Step #301).

Subsequently, the γ-LUT data is transferred (Step #303). The calculated γ-LUT data are converted into transfer data, which are transferred for the respective channels to the film image reader 100 via the SCSI controller 201 and stored in the γ-LUT 73 via the SCSI controller 10 and the DMA controller 9.

The image data reading conditions are then set (Step #305). The exposure time and the analog gains calculated in Step #119 are set, and the switches SW1, SW2 and SW3 are all set on so as to perform the black level correction, the shading correction and the γ-correction.

FIG. 11 is a flowchart showing the subroutine "Black Level Data Setting" (Steps #103, #111, #205).

Figure 2:
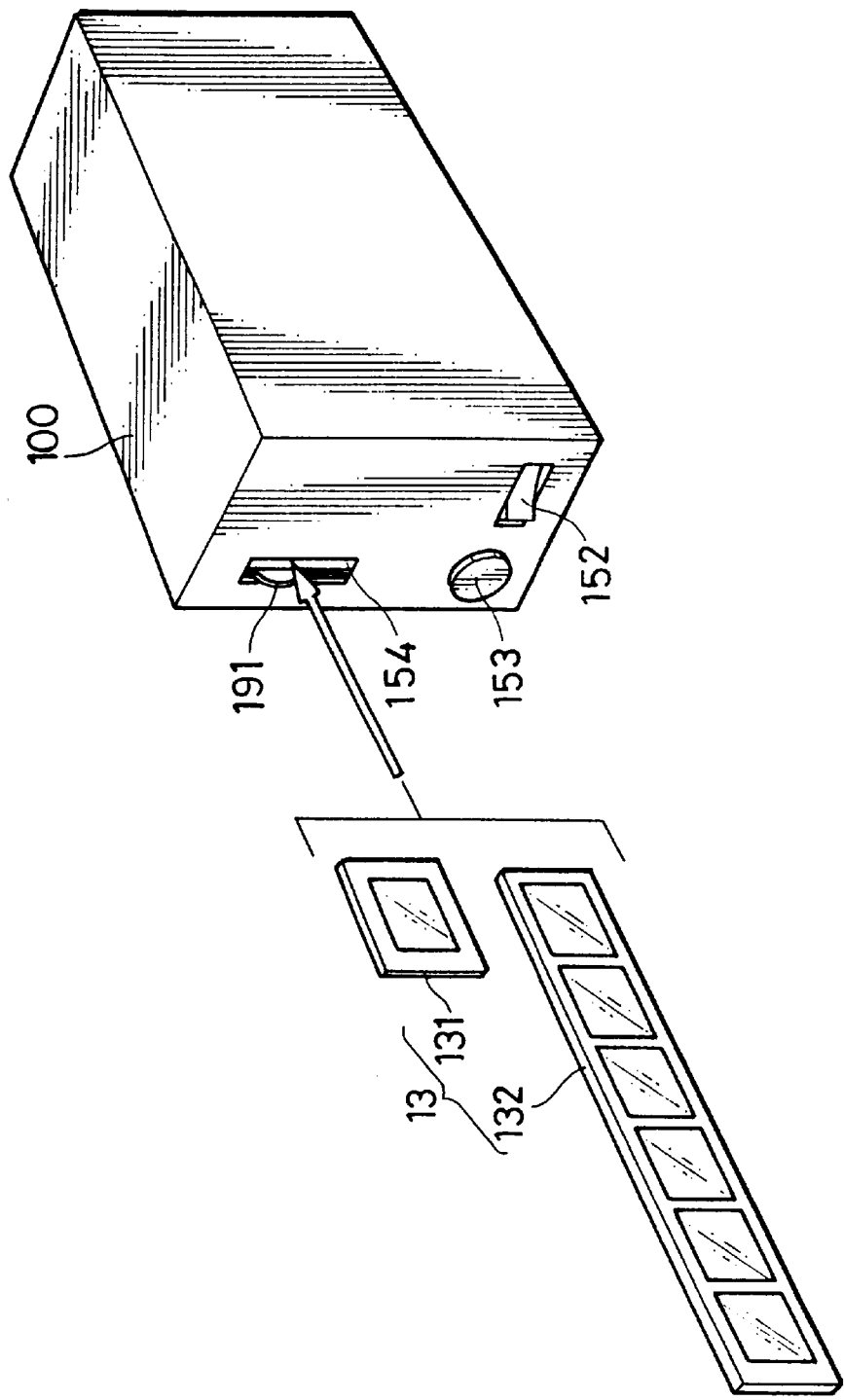
FIG. 2 is a perspective view showing an exterior of a film image reader of the image reading system.

First, black data reading conditions are set (Step #401). The exposure time and the analog gains at this time are values set in Step #101, #109 or #203. The black data is read from all pixels of one line regardless of the scanning conditions. The switches SW1, SW2, SW3 are set off, off, on, and the table of FIG. 2 is set in the γ-LUT 73.

Subsequently, the black data is read (Step #403). One line of image data, i.e., 2688 pixels×3 channels is read 16 times in the non-signal state where the CCD 2 is masked by the light blocking plate 103.

Subsequently, the black level correction data are calculated (Step #405). Average values of the 16 image data are calculated for the respective channels and pixels to calculate the black level correction data.

The black level correction data are then transferred (Step #407). The calculated black level correction data are converted into transfer data, which are transferred to the film image reader 100 line by line in the order of G, R, B via the SCSI controller 201 and stored in the RAM 74 via the SCSI controller 10 and the DMA controller 9.

TABLE 2

| | R-CHAN. | | B-CHAN. | | | | | |
|---|---|---|---|---|---|---|---|---|
| | WB | CF | WB | CF | CCD | | ANALOG GAIN | |
| FC | F | F | F | F | MAX | GAIN(R) | GAIN(G) | GAIN(B) |
| ① | 0 | 0 | 0 | 0 | G | CCDG/CCDR | 1.0 | CCDG/CCDB |
| | COMBs OTHER THAN ① TO ⑨ | | | | R | 1.0 | CCDR/CCDG | CCDR/CCDB |
| ② | 0 | 1 | 0 | 0 | | | | |
| ③ | 0 | 0 | 0 | 1 | B | CCDB/CCDR | CCDB/CCDG | 1.0 |
| ④ | 0 | 1 | 0 | 1 | | | | |
| | | | | | G | PGR_N | 1.0 | CCDG/CCDB |
| ⑤ | 1 | 0 | 0 | 0 | R | 1.0 | 1/PGR_N | (CCDG/CCDB) × (1/PGR_N) |
| | | | | | B | (CCDB/CCDG) × PGR_N | CCDB/CCDG | 1.0 |
| | | | | | G | CCDG/CCDR | 1.0 | PGB_N |

TABLE 2-continued

| | | | | | | | | |
|---|---|---|---|---|---|---|---|---|
| ⑥ | 0 | 0 | 1 | 0 | R | 1.0 | CCDR/CCDG | (CCDR/CCDG) × PGB_N |
| | | | | | B | (CCDB/CCDR) × (1/PGB_N) | 1/PGB_N | 1.0 |
| | | | | | G | PGR_N | 1.0 | PGB_N |
| ⑦ | 1 | 0 | 1 | 0 | R | 1.0 | 1/PGR_N | PGB_N/PGR_N |
| | | | | | B | PGR_N/PGB_N | 1/PGB_N | 1.0 |
| | | | | | G | PGR_N | 1.0 | CCDG/CCDB |
| ⑧ | 1 | 1 | 0 | 0 | R | 1.0 | 1/PGR_N | (CCDG/CCDB) × (1/PGR_N) |
| | | | | | B | (CCDB/CCDG) × PGR_N | CCDB/CCDG | 1.0 |
| | | | | | R | CCDG/CCDR | 1.0 | PGB_N |
| ⑨ | 0 | 0 | 1 | 1 | G | 1.0 | CCDR/CCDG | (CCDR/CCDG) × PGB_N |
| | | | | | B | (CCDB/CCDR) × (1/PGR_N) | 1/PGB_N | 1.0 |

Next, how the analog gains in TABLE-2 are calculated is described. Operational expressions for the analog gains differ depending upon which channel has the maximum value CCDMAX of the CCD output in Step #211.

In the case of the flag combinations ① to ④, i.e. in the case of the standard image and color failure image, the gains are set so that the outputs of the other channels agree with the maximum value CCDMAX of the CCD output.

Next, the flag combinations ⑤ to ⑨, i.e. the cases where the image is a black-free image and a black-free and color failure image are described.

First, the gains of the channel the flag of which is not set and of the G-channel are so set as to agree with the maximum value CCDMAX of the CCD output when the maximum CCDMAX is found in the channel the flag of which is not set or in the G-channel. On the other hand, the gains used for reading the AE data are set when the maximum CCDMAX is found in the channel whose flags is not set or in the G-channel.

In the channel(s) where the flag(s) is/are set, the gain(s) used for reading the AE data is/are set.

In this way, since the WB balance is not deviated if the image is a color failure image, the analog gains are corrected in the same manner as for the standard image, thereby obtaining a satisfactory image.

On the other hand, if the image is a black-free image or a black-free and color failure image, the WB balance is deviated. Accordingly, by setting the gains used for reading the AE data, instead of the maximum value CCDMAX of the CCD output, a satisfactory image can be obtained.

PGR_N, PGB_N in the flag combinations ⑤ to ⑨ are values as defined in Equation (21), i.e. the right terms of RGAIN, BGAIN of Equation (11). In other words, PGR_N, PGB_N are values for canceling the base color of the standard negative film.

TABLE 3

| | R-CHAN. | | B-CHAN. | | TABLE REFERENCE VALUES | | |
|---|---|---|---|---|---|---|---|
| FC | WBF | CFF | WBF | CFF | GMMAVE(R) | GMMAVE(G) | GMMAVE(B) |
| ① ALL 0 (STANDARD) COMBs OTHER THAN ① TO ⑨ | | | | | CAVR × EXP × GAIN(R) | CAVG × EXP × GAIN(G) | CAVB × EXP × GAIN(B) |
| ② | 0 | 1 | 0 | 0 | → | | (STANDARD) |
| ③ | 0 | 0 | 0 | 1 | (STANDARD) | | ← |
| ④ | 0 | 1 | 0 | 1 | → | | ← |
| ⑤ | 1 | 0 | 0 | 0 | (STANDARD) | | (STANDARD) |
| ⑥ | 0 | 0 | 1 | 0 | | | |
| ⑦ | 1 | 0 | 1 | 0 | | | |
| ⑧ | 1 | 1 | 0 | 0 | → | | (STANDARD) |
| ⑨ | 0 | 0 | 1 | 1 | (STANDARD) | | ← |

Next, operational expressions for the table reference values of TABLE-3 are described.

In TABLE-3, GAINS(G), GAIN(R), GAIN(B) are analog gains obtained from TABLE-2. CAVG, CAVR, CAVB are image reference values converted into the CCD output before the gains are adjusted in the amplifier unit 3 when the pre-scanning is performed, and are as shown in Equation (22):

$$CAVG = AVG/GGAIN$$

$$CAVR = AVR/RGAIN$$

$$CAVB = AVB/BGAIN \qquad (22).$$

Further, EXP is a ratio of the exposure time for the main scanning and that for the pre-scanning as shown in Equation (23):

$$EXP = NEG\_T/AE\_T \qquad (23).$$

Accordingly, in the case of the flag combinations ①, ⑤, to ⑦, i.e., in the case where the image is a standard image or a black-free image, the image reference values of the respective channels are set to the values used for reading the image by the main scanning.

Further, in the case of the flag combinations ②to ④, ⑧ and ⑨, i.e. in the case where the image is a color failure image or a black-free and color failure image, the image reference values of the channel(s) where the flag(s) is/are set are set equal to those of the G-channel.

Since the color balance is not deviated in the case of the black-free image, a satisfactory image can be obtained by correcting the table reference values of the respective channels in the same manner as for the standard images.

On the other hand, since the color balance is deviated in the case of the color failure image or the black-free and color failure image, a satisfactory image can be obtained by setting the table reference values of the respective channels equal to those of the G-channel having a highest visibility.

With flag combinations which are not 1,1,1,1 and different from the flag combinations ② to ⑨, the respective balances are deviated in a complex manner. Accordingly, the corresponding images are assumed to be standard images without performing the correction as for the image corresponding to the flag combinations ②, ⑨.

As described above, the type of the image is assumed based on the combination of the WB flags and the CF flags representing the results of the discriminations for the WB balance which is a color balance in the black area of the image and the color balance which is a color balance of an average bright area of the image. Values used for the color correction such as the analog gains and the table reference values are changed according to the image type. Thus, a suitable color balance can be obtained even for a color failure image.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A film image reading system comprising:
    an image pickup device which picks up a light image of an image recorded on a film to produce a raw image signal indicative of a magnitude corresponding to a light amount of the light image;
    a signal correcting device which corrects the raw image signal to a proper output image signal in accordance with a reference relationship between raw image signal and output image signal, the reference relationship having a first range for variables of raw image signal and a second range for variables of output image signal;
    a range changing device which changes the first range of the reference relationship in accordance with a characteristic of the image; and
    a reading condition controller which controls a reading condition of the image pickup device.

2. A film image reading system as defined in claim 1, wherein the range changing device shortens the first range of the reference relationship when the magnitude of the raw image signal is smaller than a predetermined value.

3. A film image reading system as defined in claim 1, wherein the image pickup device includes:
    a number of photoelectric conversion elements arranged in a predetermined form, the photoelectric conversion elements converting a light image to an analog image signal; and
    a converter for converting the analog image signal to a digital image signal indicative of a light magnitude level.

4. A film image reading system as defined in claim 3, wherein the converter includes a shading correcting device.

5. A film image reading system as defined in claim 1, wherein the reading condition controller controls the image pickup device to perform a pre-scanning of the film before picking up a light image of an image recorded on the film and sets a reading condition of the image pickup device based on a result of the pre-scanning.

6. A film image reading system comprising:
    an image pickup device including a number of photoelectric conversion elements arranged in a predetermined form, the image pickup device converting a light image of an image recorded on a film to an analog image signal indicative of a magnitude corresponding to a light amount of the light image;
    an exposure controller which controls exposure time of the image pickup device;
    a converter which converts the analog image signal to a digital image signal indicative of a light magnitude level;
    a signal correcting device which corrects the digital image signal to a proper output image signal in accordance with a reference relationship between digital image signal and output image signal, the reference relationship having a first range for variables of digital image signal and a second range for variables of output image signal; and
    a range changing device which changes the first range of the reference relationship in accordance with a controlled exposure time.

7. A film image reading system as defined in claim 6, wherein the exposure controller controls the image pickup device to perform a pre-scanning of the film before picking up a light image of an image recorded on the film and sets an exposure time of the image pickup device based on a result of the pre-scanning.

8. A film image reading system as defined in claim 7, wherein:
    the exposure controller includes:
        a calculator which calculates an exposure time corresponding to a result of the pre-scanning;
        a discriminator which discriminates whether a calculated exposure time is greater than a predetermined value; and
        a setter which is responsive to the discriminator and sets an exposure time of the image pickup device to the predetermined value when the calculated exposure time is discriminated to be greater than a predetermined value; and
    the range changing device is responsive to the discriminator and shortens the first range of the reference relationship when the calculated exposure time is discriminated to be greater than a predetermined value.

9. An image capturing device comprising:
    an image pickup device which picks up a light image of an image to produce a raw image signal indicative of a magnitude corresponding to a light amount of the light image;
    a signal correcting device which corrects the raw image signal to a proper output image signal in accordance with a reference relationship between raw image signal and output image signal, the reference relationship having a first range for variables of raw image signal and a second range for variables of output image signal;
    a range changing device which changes the first range of the reference relationship in accordance with a characteristic of the image; and an image pickup condition controller which controls an image pickup condition of the image pickup device.

10. An image capturing device comprising:

an image pickup device including a number of photoelectric conversion elements arranged in a predetermined form, the image pickup device converting a light image of an image to an analog image signal indicative of a magnitude corresponding to a light amount of the light image;

an exposure controller which controls exposure time of the image pickup device;

a converter which converts the analog image signal to a digital image signal indicative of a light magnitude level;

a signal correcting device which corrects the digital image signal to a proper output image signal in accordance with a reference relationship having a first range for variables of digital image signal and a second range for variables of output image signal; and a range changing device which changes the first range of the reference relationship in accordance with a controlled exposure time.

11. A method for capturing images, comprising the steps of:

converting a light image of an image to an analog image signal indicative of a magnitude corresponding to a light amount of the light image by an image pickup device;

controlling an exposure time of the image pickup device;

converting the analog image signal to a digital image signal indicative of a light magnitude level;

correcting the digital image signal to a proper output image signal in accordance with a reference relationship having a first range for variables of the digital image signal and a second range for variables of the output image signal; and changing the first range of the reference relationship in accordance with a controlled exposure time.

12. The method of claim 11, wherein said step of changing the first range comprises the steps of:

pre-scanning the light image to producing a pre-scanning result;

calculating an exposure time corresponding to the result of the pre-scanning;

discriminating whether the calculated exposure time is greater than a predetermined value; and changing the first range of the reference relationship when the calculated exposure time is discriminated to be greater than a predetermined value.

13. The method of claim 12, further including the step of setting an exposure time to the predetermined value when the calculated exposure time is discriminated to be greater than a predetermined value.

* * * * *